US012647666B2

(12) United States Patent
Chen et al.

(10) Patent No.: US 12,647,666 B2
(45) Date of Patent: Jun. 2, 2026

(54) CAMERA MODULE AND ELECTRONIC DEVICE

(71) Applicant: VIVO MOBILE COMMUNICATION CO., LTD., Chang'an (CN)

(72) Inventors: Guanglong Chen, Chang'an (CN); Dongcun Cheng, Chang'an (CN); Haibo Que, Chang'an (CN); JianTang Lin, Chang'an (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 116 days.

(21) Appl. No.: 18/435,512

(22) Filed: Feb. 7, 2024

(65) Prior Publication Data

US 2024/0179388 A1 May 30, 2024

Related U.S. Application Data

(63) Continuation of application No. PCT/CN2022/113912, filed on Aug. 22, 2022.

(30) Foreign Application Priority Data

Aug. 27, 2021 (CN) .......................... 202110997105.9

(51) Int. Cl.
*H04N 23/55* (2023.01)

(52) U.S. Cl.
CPC .................................... *H04N 23/55* (2023.01)

(58) Field of Classification Search
CPC ...................................................... H04N 23/55
USPC .......................................................... 348/335
See application file for complete search history.

(56) References Cited

U.S. PATENT DOCUMENTS

2017/0351164 A1 12/2017 Kim et al.

FOREIGN PATENT DOCUMENTS

| CN | 111147721 A | 5/2020 |
| CN | 111212216 A | 5/2020 |
| CN | 112526700 A | 3/2021 |
| CN | 113109918 A | 7/2021 |
| JP | 2007034070 A | 2/2007 |
| JP | 2011069886 A | 4/2011 |

OTHER PUBLICATIONS

First Japanese Office Action related to Application No. 2024-510525; reported on Jan. 10, 2025.
International Search Report and Written Opinion related to Application No. PCT/CN2022/113912; reported on Oct. 31, 2022.

*Primary Examiner* — Joel W Fosselman

(57) ABSTRACT

This application discloses a camera module and an electronic device. The camera module includes a photosensitive chip, a first lens barrel, a first lens, a rotating assembly, an elastic member, and a drive mechanism. The first lens barrel is provided with the first lens that is disposed opposite the photosensitive chip. The rotating assembly fits around the first lens barrel, and is connected to the rotating assembly via a first fitting convex portion and a first spiral guide slot. The rotating assembly includes a body member and a transmission member that are disposed separately. A first end of the elastic member is connected to the body member, and a second end of the elastic member is connected to the transmission member. The drive mechanism is connected to the transmission member, and the drive mechanism drives, via the transmission member, the elastic member, and the body member in turn.

16 Claims, 6 Drawing Sheets

CAMERA MODULE AND ELECTRONIC DEVICE

CROSS-REFERENCE TO RELATED APPLICATIONS

The present invention is a Bypass Continuation Application of PCT International Application No. PCT/CN2022/113912 filed on Aug. 22, 2022, which claims priority to Chinese Patent Application No. 202110997105.9, filed with the China National Intellectual Property Administration on Aug. 27, 2021 and entitled "CAMERA MODULE AND ELECTRONIC DEVICE", which is incorporated herein by reference in its entirety.

TECHNICAL FIELD

This application pertains to the field of camera technologies and specifically relates to a camera module and an electronic device.

BACKGROUND

Nowadays, with the constant improvement of camera technologies of electronic devices, people wish to shoot images of higher quality using electronic devices.

In an actual shooting process, an object being shot can be magnified using optical zoom. The object being shot can be magnified by changing a distance between a lens and the object being shot using optical zoom, so the lens needs to move during a zoom process. To implement movement of the lens, a fitting protrusion can be provided on one lens barrel and a sliding slot can be provided on the other lens barrel, and the fitting protrusion is in sliding fit with the sliding slot to implement relative movement between the two lens barrels, and ultimately implement the movement of the lens.

However, when a user uses an electronic device, a camera module in a stretching state is easily subjected to a pressure due to falling, collision, and artificial press. Under the action of such pressure, lens barrels of the camera module exhibit a trend of retracting, yet a drive source for outputting a drive force in the camera module does not work, so the lens barrels are unable to retract. This leads to mutual extrusion of the lens barrels at fitting protrusions, such that the fitting protrusions are easily damaged, and therefore such camera module has short service life.

SUMMARY

According to a first aspect, an embodiment of this application provides a camera module including a photosensitive chip, a first lens barrel, a first lens, a rotating assembly, an elastic member, and a drive mechanism.

The first lens barrel is provided with the first lens, the first lens is disposed opposite the photosensitive chip, the rotating assembly sleeves the first lens barrel, and the first lens barrel is connected to the rotating assembly via a first fitting convex portion and a first spiral guide slot.

The rotating assembly includes a body member and a transmission member that are disposed separately, a first end of the elastic member is connected to the body member, a second end of the elastic member is connected to the transmission member, and the drive mechanism is connected to the transmission member.

The drive mechanism drives, via the transmission member, the elastic member, and the body member in turn, the first lens barrel to move along a first direction with fitting of the first fitting convex portion and the first spiral guide slot, the first direction being a direction approaching or leaving the photosensitive chip.

In a case that the first lens barrel is subjected to an external force, the elastic member makes the first lens barrel move along a direction approaching the photosensitive chip.

According to a second aspect, an embodiment of this application provides an electronic device including the foregoing camera module.

DESCRIPTION OF REFERENCE SIGNS

Figure 1:
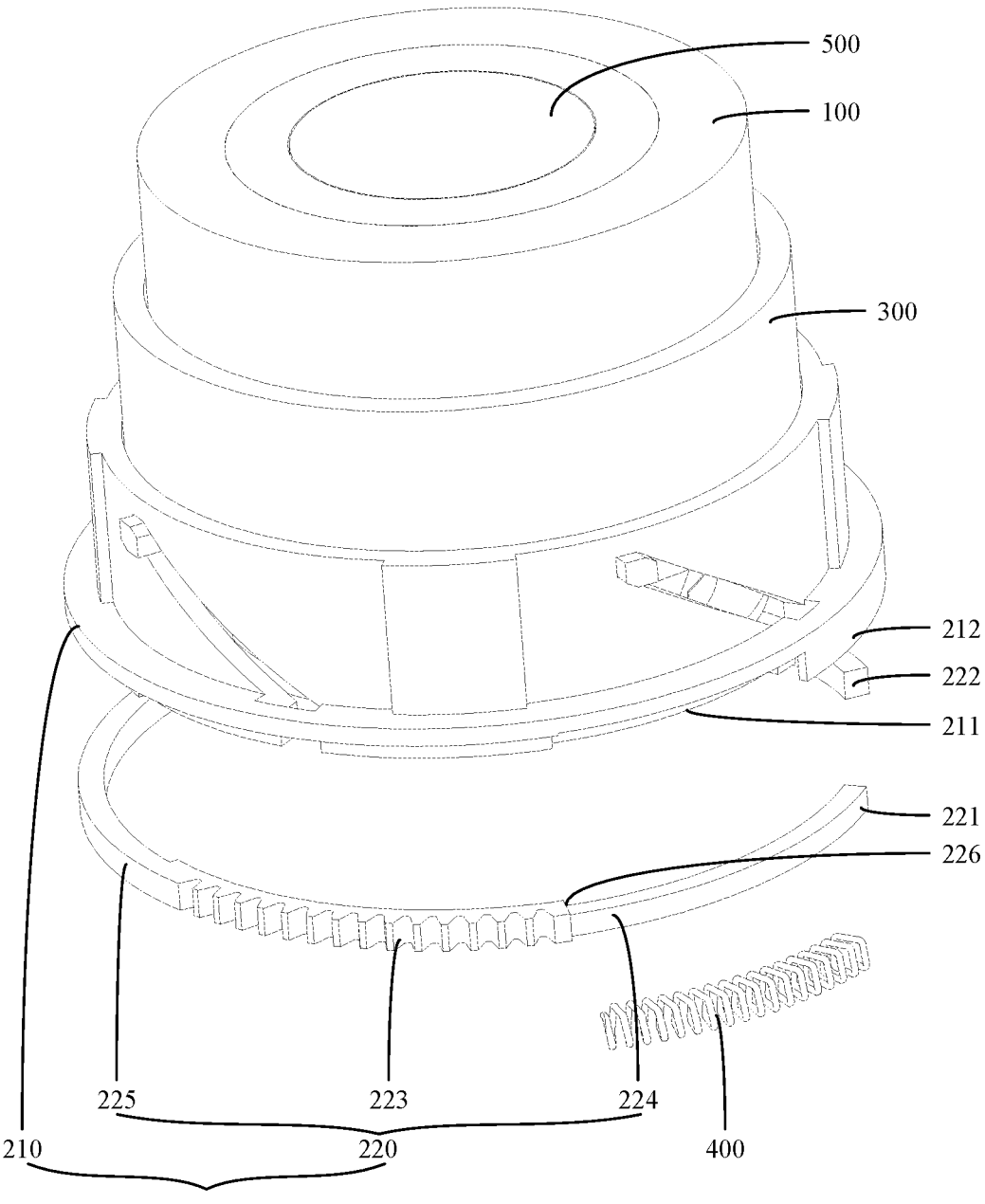
FIG. 1 is an exploded view of a camera module disclosed in a first embodiment of this application.

100. first lens barrel;
200. rotating assembly; 210. body member; 211. guide slot; 212. first action portion; 213. third action portion; 214. third spiral guide slot; 215. second limiting straight slot; 220. transmission member; 221. third end; 222. fourth end; 223. rack portion; 224. rod portion; 225. guide portion; 226. second action portion; 227. first support convex portion; 228. second support convex portion; 240. mounting member;
300. second lens barrel;
400. elastic member;
500. first lens;
600. base;
700. drive lens barrel; 710. third fitting convex portion; and 720. third limiting straight slot.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

The terms "first", "second", and the like in the specification and claims of this application are used to distinguish between similar objects rather than to describe a specific order or sequence. It should be understood that data used in this way are interchangeable in appropriate circumstances such that the embodiments of this application can be implemented in an order other than those illustrated or described herein. In addition, "first" and "second" are typically used to distinguish objects of a same type and do not limit quantities of the objects. For example, there may be one or more first objects. In addition, in this specification and claims, "and/or" indicates at least one of the connected objects, and the character "/" generally indicates an "or" relationship between the contextually associated objects.

The following describes in detail the camera module and electronic device provided in the embodiments of this application through specific embodiments and application scenarios thereof with reference to the accompanying drawings.

As shown in FIG. 1 to FIG. 7, an embodiment of this application provides a camera module. The camera module includes a base 600, a photosensitive chip, a first lens barrel 100, a first lens 500, a rotating assembly 200, an elastic member 400, and a drive mechanism.

The photosensitive chip is disposed in the base 600, and the base 600 may be provided with other components of the camera module in addition to the photosensitive chip. In addition, the base 600 may include other parts in addition to the parts shown in FIG. 5. The first lens barrel 100 is provided with the first lens 500, the first lens 500 is disposed opposite the photosensitive chip, and the first lens 500 and the photosensitive chip may be disposed along an optical axis direction of the camera module. The photosensitive chip may be configured to receive light emitted through the first lens 500 and ultimately convert an optical signal into a digital image signal, so as to obtain an image.

The rotating assembly 200 sleeves the first lens barrel 100, and the first lens barrel 100 is connected to the rotating assembly 200 via a first fitting convex portion and a first spiral guide slot. The rotating assembly 200 includes a body member 210 and a transmission member 220 that are disposed separately, a first end of the elastic member 400 is connected to the body member 210, and a second end of the elastic member 400 is connected to the transmission member 220. Optionally, of the body member 210 and the first lens barrel 100, one is provided with the first fitting convex portion and the other is provided with the first spiral guide slot, so that the body member 210 can directly drive the first lens barrel 100 to stretch and retract. Since the body member 210 and the transmission member 220 are disposed separately, movements of the two can be separate. In other words, the transmission member 220 can transfer a drive force to the body member 210 via the elastic member 400, causing the body member 210 to rotate, and when the transmission member 220 transfers no drive force to the body member 210, the body member 210 can rotate with respect to the transmission member 220 under the action of an external force. Optionally, the elastic member 400 may be a spring, and the elastic member 400 and the body member 210 may just abut against each other, or may be connected through welding, snap-fitting, or the like. Similarly, the elastic member 400 and the body member 210 may just abut against each other, or may be connected through welding, snap-fitting, or the like. In addition, a cross section of the elastic member 400 may be the same in shape as a portion, of the transmission member 220, where the elastic member 400 is disposed. For example, the cross section of the elastic member 400 may be circular, rectangular, triangular, or the like. This is not limited in this embodiment of this application.

The drive mechanism is connected to the transmission member 220, and the drive mechanism drives, via the transmission member 220, the elastic member 400, and the body member 210 in turn, the first lens barrel 100 to move along a first direction with fitting of the first fitting convex portion and the first spiral guide slot, the first direction being a direction approaching or leaving the photosensitive chip. Optionally, the drive mechanism herein may include components such as a motor and a transmission gear. When the drive mechanism outputs a drive force, the transmission member 220 rotates under the action of this drive force, the transmission member 220 drives the body member 210 to rotate via the elastic member 400, and with fitting of the first fitting convex portion and the first spiral guide slot, the first lens barrel 100 can move along a direction leaving the photosensitive chip, thereby causing the first lens barrel 100 to stretch out. When the drive mechanism outputs a reversed drive force, the transmission member 220 drives the body member 210 to rotate via the elastic member 400, and with fitting of the first fitting convex portion and the first spiral guide slot, the first lens barrel 100 can move along a direction approaching the photosensitive chip, thereby causing the first lens barrel 100 to retract.

The foregoing describes the process of the drive mechanism driving the first lens barrel 100 to move. When the first lens barrel 100 is in a stretching state, once the first lens barrel 100 is subjected to an external force, the first lens barrel 100 exhibits a trend of retracting, in which case although the drive mechanism does not work, the first lens barrel 100 can still move due to the presence of the elastic member 400, that is, in a case that the first lens barrel 100 is subjected to an external force, the elastic member 400 makes the first lens barrel 100 move along the direction approaching the photosensitive chip. Specifically, if the first lens barrel 100 exhibits a trend of moving along the direction approaching the photosensitive chip, the first lens barrel 100 can drive the body member 210 to rotate, and the body member 210 further drives one end of the elastic member 400 to move. Since the other end of the elastic member 400 is connected to the transmission member 220 and the transmission member 220 does not move, the elastic member 400 deforms, thereby absorbing the external force on the first lens barrel 100. After the external force on the first lens barrel 100 disappears, the elastic member 400 resumes from deformation, so that the body member 210 drives the first lens barrel 100 to reset to the stretching state. In this way, the camera module can continue to work with the first lens barrel 100 stretching out, without the need for the drive mechanism to drive the first lens barrel 100 to stretch out again.

In this embodiment of this application, when the camera module requires zooming, the drive mechanism drives, via the transmission member 220, the elastic member 400, and the body member 210 in turn, the first lens barrel 100 to move along the first direction with fitting of the first fitting convex portion and the first spiral guide slot, so as to drive the first lens 500 to leave or approach the photosensitive chip; and when the camera module in the stretching state is subjected to a pressure due to falling, collision, artificial press, and other situations, the first lens barrel 100 drives the body member 210 to rotate, then the body member 210 applies a pressure to the elastic member 400, causing the elastic member 400 to deform, while the transmission member 220 can keep still. The elastic member 400 can convert dynamic potential energy, generated by the camera module under pressure, into its own elastic potential energy, thereby providing buffering, so that the first fitting convex portion is not prone to breakage due to extrusion, and other parts of the camera module are also not prone to an impact force. Therefore, this embodiment can solve the problem of short service life of the camera module.

As mentioned above, the body member 210 can directly drive the first lens barrel 100. In other embodiments, the camera module may further include a second lens barrel 300 and a drive lens barrel 700. The base 600 sleeves at least part of the body member 210, and the base 600 is provided with a second spiral guide slot and a first limiting straight slot.

The body member 210 is provided with a third spiral guide slot 214 and a second limiting straight slot 215. The second lens barrel 300 is provided with a second fitting convex portion, where the second fitting convex portion fits with the second spiral guide slot, and the second fitting convex portion also fits with the second limiting straight slot 215 of the body member 210. The drive lens barrel 700 is provided with a third fitting convex portion 710 and a third limiting straight slot 720, where the third fitting convex portion 710 fits with both the third spiral guide slot 214 and the first limiting straight slot. The first lens barrel 100 is provided with the first fitting convex portion, the second lens barrel 300 is provided with the first spiral guide slot, and the first fitting convex portion fits with both the first spiral guide slot and the third limiting straight slot 720. The first limiting straight slot, the second limiting straight slot 215, and the third limiting straight slot 720 herein all extend along the first direction. When the drive mechanism drives the body member 210 to rotate, the second lens barrel 300 rotates and moves along the first direction with fitting of the second fitting convex portion with the second spiral guide slot and fitting of the second fitting convex portion with the second limiting straight slot 215, the drive lens barrel 700 only moves along the first direction with fitting of the third fitting convex portion 710 with the third spiral guide slot 214 and fitting of the third fitting convex portion 710 with the first limiting straight slot, and the first lens barrel 100 only moves along the first direction with fitting of the first fitting convex portion with the first spiral guide slot and fitting of the first fitting convex portion with the third limiting straight slot 720. In this embodiment, both the first lens barrel 100 and the second lens barrel 300 can move along the first direction, so that the first lens 500 has a greater variation range of position with respect to the photosensitive chip, thereby improving a zoom effect of the camera module. When the first lens barrel 100 is subjected to an external force, the first lens barrel 100 moves along the direction approaching the photosensitive chip so as to drive the second lens barrel 300 to rotate and gradually approach the photosensitive chip, the second lens barrel 300 then drives the drive lens barrel 700 to move along the direction approaching the photosensitive chip, and the drive lens barrel 700 then drives the body member 210 to rotate, while the transmission member 220 keeps still.

It should be noted that the solution that the elastic member 400 absorbs an external force disclosed in this embodiment of this application may be applicable to any camera module with a body member 210 and a transmission member 220. This is not limited in this embodiment of this application.

The body member 210 may be an arc-shaped structure with a notch, but the entire center of gravity of the camera module is prone to change when such body member 210 rotates, which results in deteriorated stability of the camera module. In view of this, the body member 210 may be arranged as an annular member, in which case the transmission member 220 and the elastic member 400 are both disposed in a circumferential direction of the body member 210. The elastic member 400 may be designed in correspondence to a local part of the transmission member 220, so that the elastic member 400 is neither too long nor too short, thereby not only guaranteeing elastic deformability of the elastic member 400 but also reducing space occupied by the elastic member 400, so as to facilitate arrangement of other components of the camera module.

Figure 2:
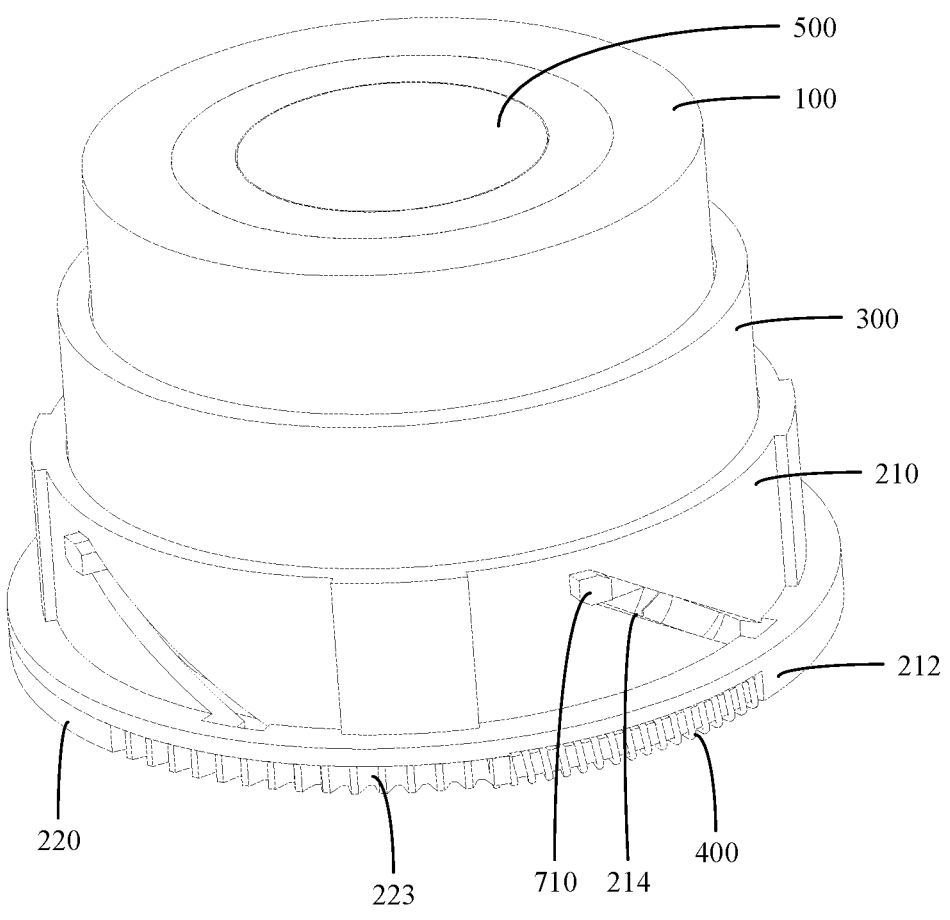
FIG. 2 and FIG. 3 are schematic structural diagrams of the camera module disclosed in the first embodiment of this application in different states.
Figure 3:
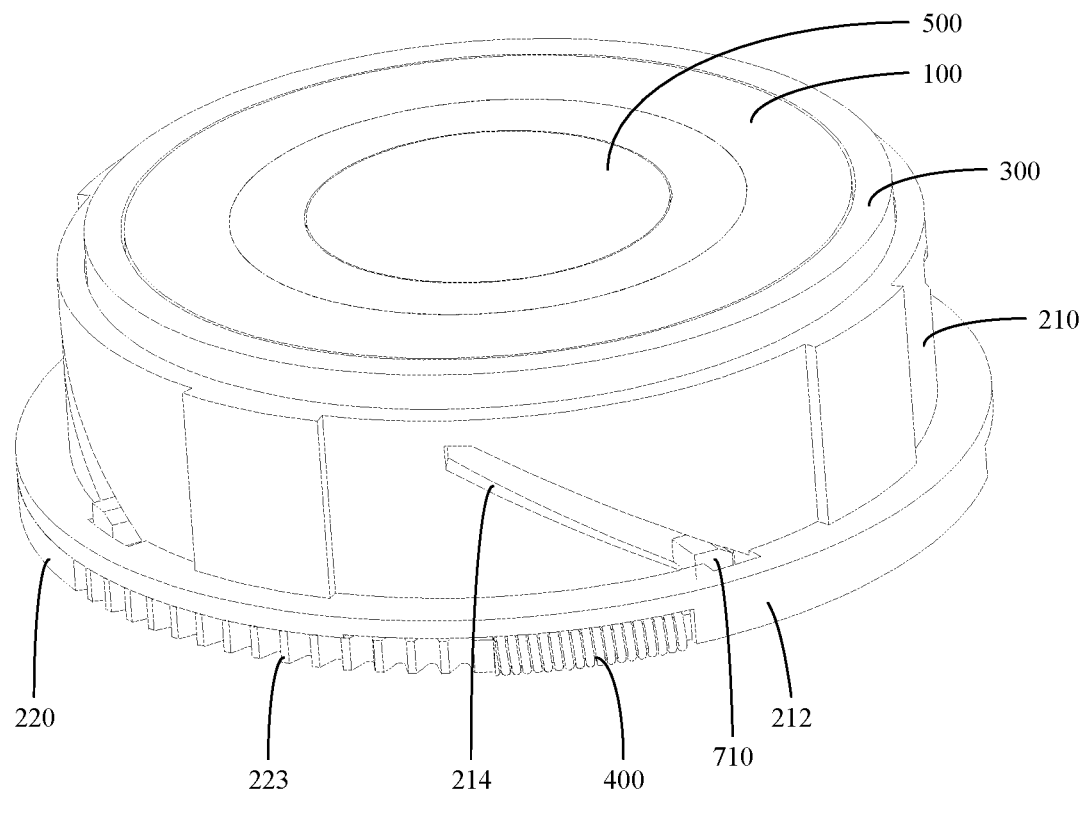

In an optional embodiment, as shown in FIG. 1 to FIG. 3, the transmission member 220 has a third end 221 and a fourth end 222, the third end 221 and the fourth end 222 being apart from each other, to be specific, the transmission member 220 is not a closed annular structure but is instead an arc-shaped component with a notch, and due to the presence of the notch, the elastic member 400 can sleeve the transmission member 220 through the notch. In this embodiment, the transmission member 220 adopts a rod component with a relatively simple structure, and the elastic member 400 can directly sleeves the transmission member 220. In this way, in this embodiment, the structure and assembly of the camera module can be simplified, the processing costs of the camera module can be reduced, and the camera module can have more space for arranging other components.

The transmission member 220 may be entirely disposed outside the body member 210. In another optional embodiment, the body member 210 is provided with a guide slot 211 and a first action portion 212, where the guide slot 211 may extend along the circumferential direction of the body member 210, the transmission member 220 fits with the guide slot 211, the first action portion 212 is connected to the first end of the elastic member 400, and a portion of the transmission member 220 is disposed between a side wall of the guide slot 211 and the first action portion 212. When the first lens barrel 100 is subjected to an external force, the body member 210 rotates relative to the transmission member 220, and at this time, the guide slot 211 fits with the transmission member 220 to provide a guiding effect, so that the body member 210 rotates more smoothly. In addition, the first action portion 212 may apply a force to the elastic member 400 to drive the elastic member 400 to deform. In this embodiment, at least a portion of the transmission member 220 is accommodated in the guide slot 211, allowing the transmission member 220 to take up less extra space, and thus facilitating arrangement of other components of the camera module.

Optionally, the transmission member 220 may include a rack portion 223 and a rod portion 224, where the rack portion 223 is connected to the drive mechanism, the rack portion 223 is provided with a second action portion 226 at an end, and the second end of the elastic member 400 is connected to the second action portion 226. In this embodiment, the structure of the rack portion 223 is directly utilized to implement the connection between the transmission member 220 and the elastic member 400, without the need for additionally providing a component to implement the connection between the transmission member 220 and the elastic member 400, thereby simplifying the structure of the camera module, and also facilitating layout of the components of the camera module. In addition, when the body member 210 is provided with the guide slot 211 and the first action portion 212, the guide slot 211 may be provided with an avoidance notch on a side facing away from an optical axis of the first lens 500, and the avoidance notch can avoid the rack portion 223, so that the drive mechanism can be connected to the rack portion 223.

Further, the transmission member 220 further includes a guide portion 225, where the guide portion 225 is connected to the rod portion 224 via the rack portion 223, and the guide portion 225 can fit with the guide slot 211, so as to further enhance smoothness and stability of the body member 210 during rotation.

Figure 4:
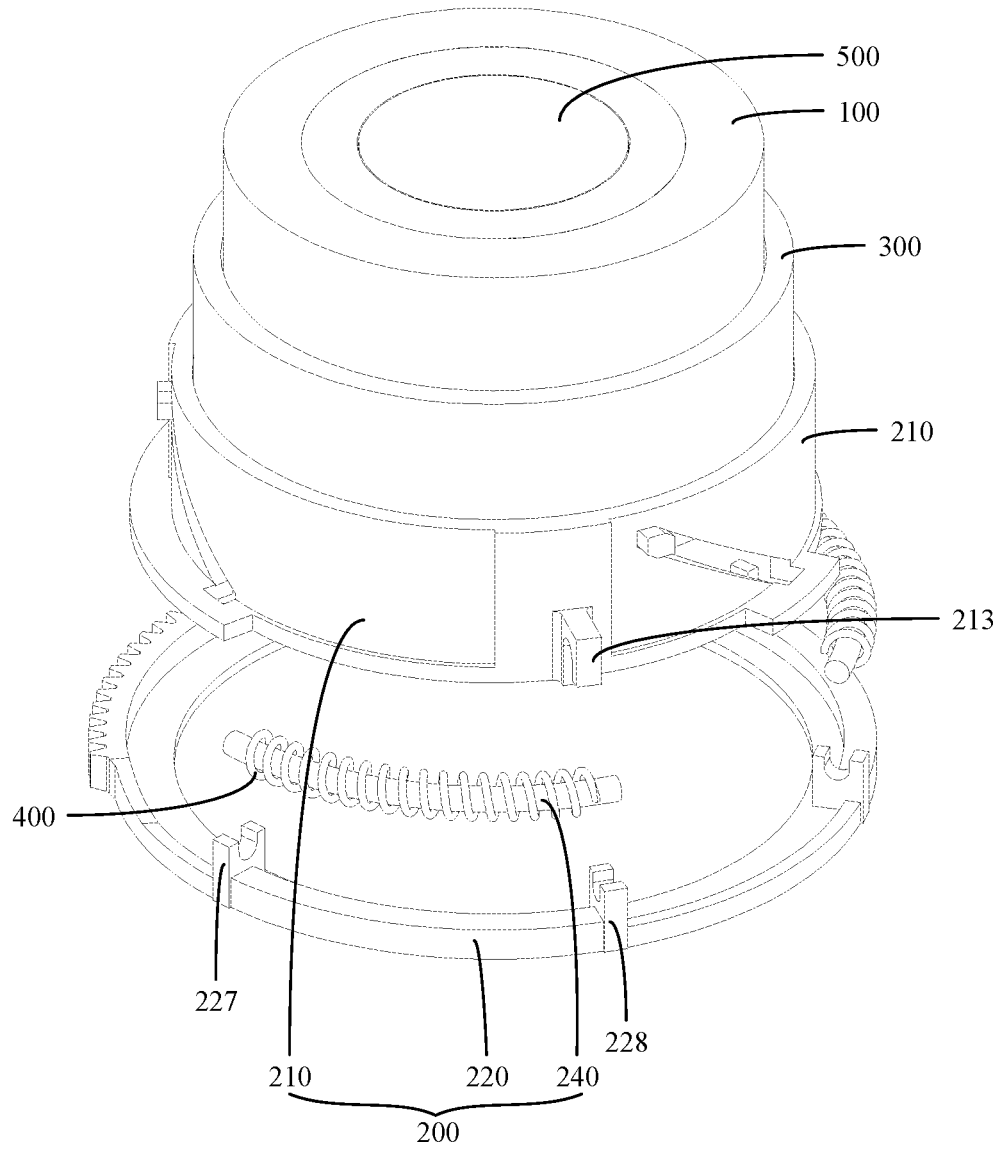
FIG. 4 is an exploded view of a camera module disclosed in a second embodiment of this application.
Figure 5:
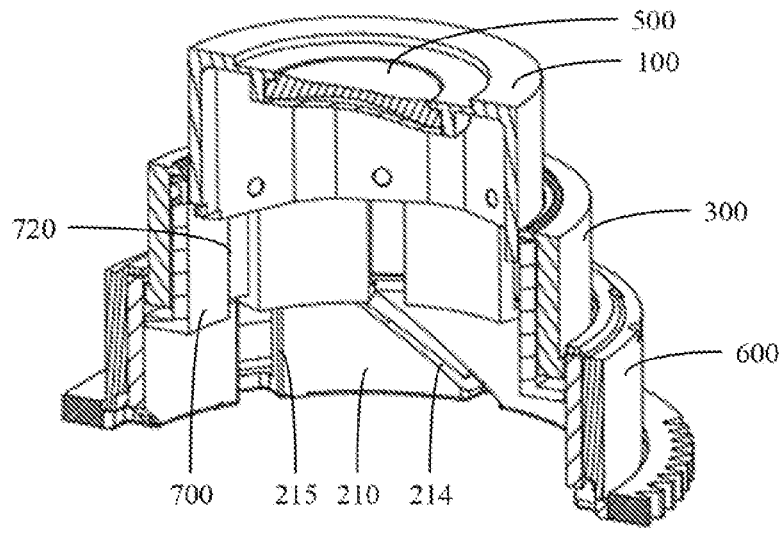
FIG. 5 is a cross-sectional view of the camera module disclosed in the second embodiment of this application.
Figure 6:
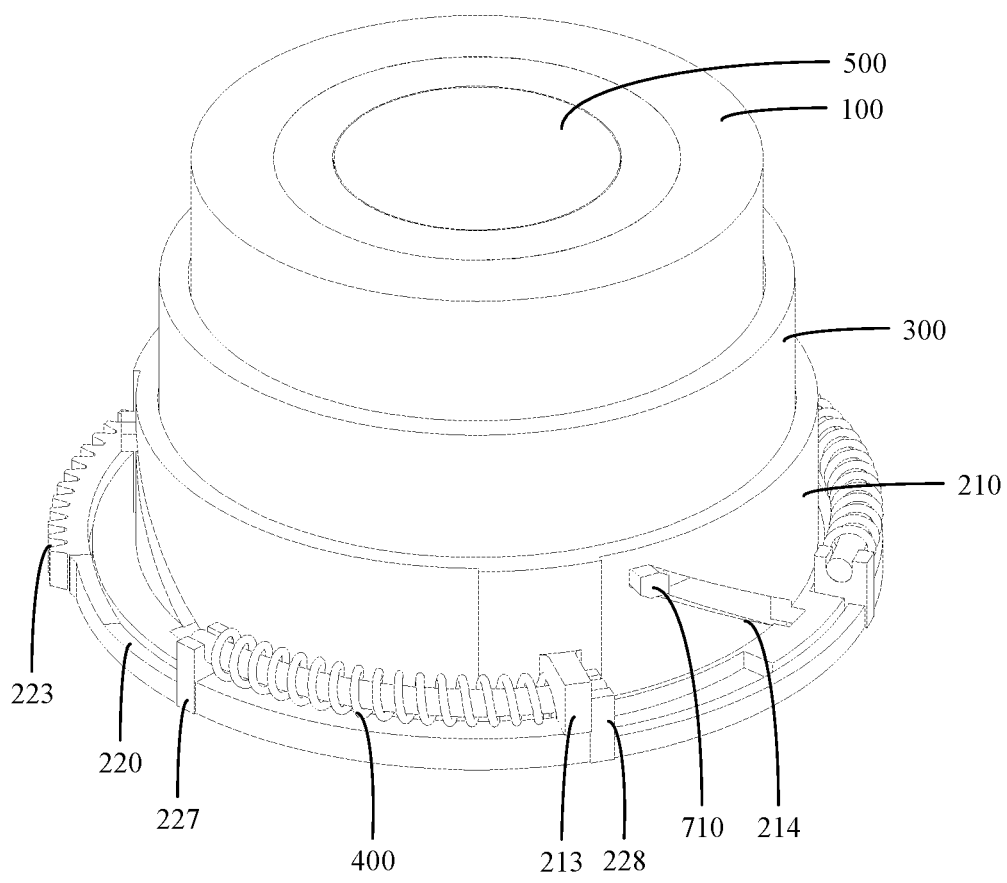
FIG. 6 and FIG. 7 are schematic structural diagrams of the camera module disclosed in the second embodiment of this application in different states.
Figure 7:
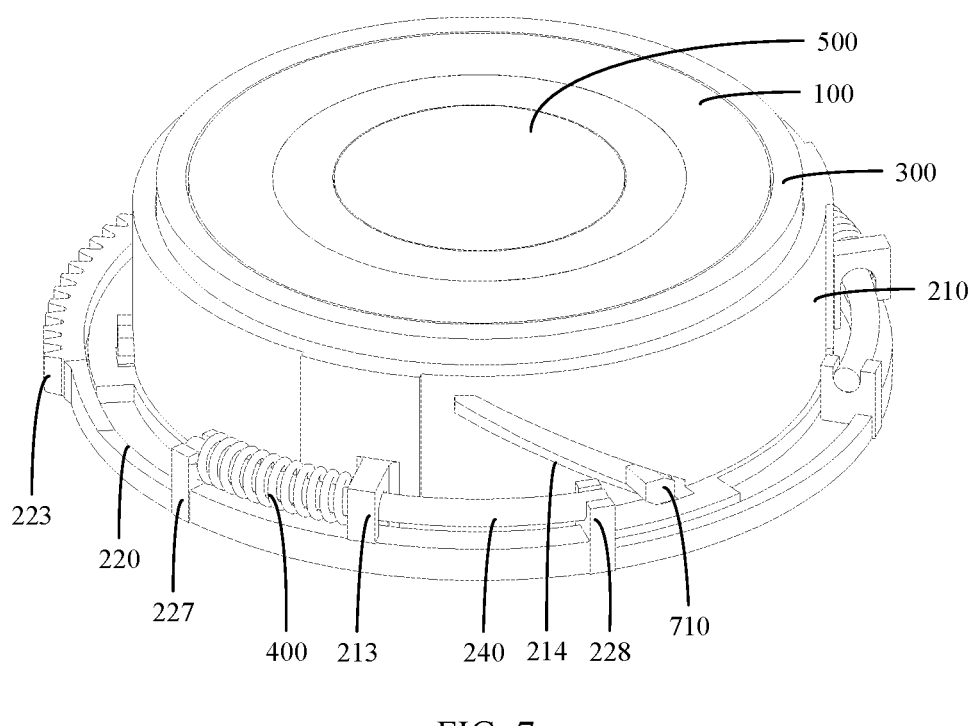

In another optional embodiment, as shown in FIG. 4 to FIG. 6, the rotating assembly 200 further includes a mounting member 240, the mounting member 240 and the transmission member 220 are disposed separately and connected to each other, and the elastic member 400 sleeves the mounting member 240. In this embodiment, the second end of the elastic member 400 is connected to the transmission member 220 via the mounting member 240. Since the elastic member 400 can be mounted via the additionally provided mounting member 240, the structural design of the elastic member 400 is not likely to be limited by the transmission member 220, and therefore the elastic member 400 can be more flexibly arranged, allowing the elastic member 400 to have stronger capability of absorbing an external force. Optionally, the mounting member 240 may be an arc-shaped rod component, facilitating mounting of the elastic member 400.

Further, the transmission member 220 may be arranged as an annular member, making the camera module more stable during telescopic movement. In addition, the annular transmission member 220 has higher structural strength, which not only facilitates transfer of a drive force output by the drive mechanism but the transmission member 220 can also withstand a force exerted by the elastic member 400, preventing such force from causing damage to the transmission member 220 and the drive mechanism. In this embodiment, the transmission member 220 may likewise include a rack portion 223, where the rack portion 223 may be disposed at a local part of the transmission member 220, or may be arranged in an annular shape. This is not limited in this embodiment of this application.

The elastic member 400 may be disposed on an inner side or outer side of the transmission member 220. To be specific, the elastic member 400 and the transmission member 220 may be arranged along a direction perpendicular to the optical axis of the camera module. In another embodiment, the transmission member 220 and the elastic member 400 are arranged along a direction parallel to the optical axis of the camera module. As space on the inner side and outer side of the transmission member 220 is usually insufficient, while space above or below the transmission member 220 is relatively large, the latter embodiment is more conducive to a compact design of the camera module.

Optionally, the transmission member 220 is provided with a first support convex portion 227 and a second support convex portion 228, and the mounting member 240 is connected to both the first support convex portion 227 and the second support convex portion 228. Optionally, the first support convex portion 227 and the second support convex portion 228 may each be provided with a recess, two ends of the mounting member 240 are respectively disposed at the recess of the first support convex portion 227 and the recess of the second support convex portion 228, and at least one end of the mounting member 240 fits with the recess in a limiting manner, so that the mounting member 240 does not move with respect to the transmission member 220. It should be noted that the mounting member 240 may rotate with respect to the transmission member 220 or may remain completely fixed with respect to the transmission member 220.

The first support convex portion 227 and second support convex portion 228 may be only used to support the mounting member 240. However, to fully utilize the structure of the second support convex portion 228, the body member 210 may be provided with a third action portion 213, where the third action portion 213 may protrude with respect to an outer peripheral surface of the body member 210, the first end of the elastic member 400 is connected to the third action portion 213, and the third action portion 213 may fit with the second support convex portion 228 in a limiting manner. The second end of the elastic member 400 is connected to the first support convex portion 227. In this embodiment, the second support convex portion 228 can be used to assist in limiting a position of the body member 210 with respect to the transmission member 220, so as to prevent excessive rotation or unstable rotation of the body member 210 due to the action of the elastic member 400 or other factors, thus allowing for more stable and reliable zooming of the camera module.

One or a plurality of elastic members 400 may be provided. When the body member 210 is an annular member, at least two elastic members 400 are provided, and the elastic members 400 are spaced apart along a circumferential direction of the body member 210. In this case, the elastic members 400 can absorb external forces at multiple positions, preventing unbalanced loading of the camera module, and thus improving reliability of the camera module during operation.

An embodiment of this application further discloses an electronic device, where the electronic device includes the camera module according to any one of the foregoing embodiments.

The electronic device disclosed in this embodiment of this application may be a smartphone, a tablet computer, an e-book reader, a wearable device (for example, a smart watch), a game console, or other devices. A specific type of the electronic device is not limited in this embodiment of this application.

The embodiments of this application have been described with reference to the accompanying drawings. However, this application is not limited to the foregoing specific implementations. These specific implementations are merely for illustration rather than limitation. Inspired by this application, persons of ordinary skill in the art may develop many other forms which do not depart from the essence of this application and the protection scope of the claims, and all such forms shall fall within the protection scope of this application.

What is claimed is:

1. A camera module, comprising a photosensitive chip, a first lens barrel, a first lens, a rotating assembly, an elastic member, and a drive mechanism, wherein the first lens barrel is provided with the first lens, the first lens is disposed opposite the photosensitive chip, the rotating assembly sleeves the first lens barrel, and the first lens barrel is connected to the rotating assembly via a first fitting convex portion and a first spiral guide slot;

the rotating assembly comprises a body member and a transmission member that are disposed separately, a first end of the elastic member is connected to the body member, a second end of the elastic member is connected to the transmission member, and the drive mechanism is connected to the transmission member; wherein an arrangement manner of the elastic member comprises: the transmission member has a third end and a fourth end, the third end and the fourth end being apart from each other, and the elastic member sleeves the transmission members; or, the rotating assembly further comprises a mounting member, the mounting member and the transmission member are disposed separately and connected to each other, and the elastic member sleeves the mounting member;

the drive mechanism drives, via the transmission member, the elastic member, and the body member in turn, the first lens barrel to move along a first direction with fitting of the first fitting convex portion and the first spiral guide slot, the first direction being a direction approaching or leaving the photosensitive chip; and in a case that the first lens barrel is subjected to an external force, the elastic member makes the first lens barrel move along a direction approaching the photosensitive chip.

2. The camera module according to claim 1, wherein the body member is an annular member, and the transmission member and the elastic member are both disposed in a circumferential direction of the body member.

3. The camera module according to claim 1, wherein the body member is provided with a guide slot and a first action portion, the transmission member fits with the guide slot, the first action portion is connected to the first end, and a portion of the transmission member is disposed between a side wall of the guide slot and the first action portion.

4. The camera module according to claim 1, wherein the transmission member comprises a rack portion and a rod portion, wherein the rack portion is connected to the drive mechanism, the rack portion is provided with a second action portion at an end, and the second end is connected to the second action portion.

5. The camera module according to claim 1, wherein the transmission member is an annular member.

6. The camera module according to claim 1, wherein the transmission member and the elastic member are arranged along a direction parallel to an optical axis of the camera module.

7. The camera module according to claim 1, wherein the transmission member is provided with a first support convex portion and a second support convex portion, the mounting member is connected to both the first support convex portion and the second support convex portion, the body member is provided with a third action portion, the first end is connected to the third action portion, the third action portion fits with the second support convex portion in a limiting manner, and the second end is connected to the first support convex portion.

8. The camera module according to claim 1, wherein the body member is an annular member, at least two elastic members are provided, and the elastic members are spaced apart along a circumferential direction of the body member.

9. An electronic device, comprising a camera module, wherein the camera module comprises a photosensitive chip, a first lens barrel, a first lens, a rotating assembly, an elastic member, and a drive mechanism, wherein the first lens barrel is provided with the first lens, the first lens is disposed opposite the photosensitive chip, the rotating assembly sleeves the first lens barrel, and the first lens barrel is connected to the rotating assembly via a first fitting convex portion and a first spiral guide slot;

the rotating assembly comprises a body member and a transmission member that are disposed separately, a first end of the elastic member is connected to the body member, a second end of the elastic member is connected to the transmission member, and the drive mechanism is connected to the transmission member;

wherein an arrangement manner of the elastic member comprises: the transmission member has a third end and a fourth end, the third end and the fourth end being apart from each other, and the elastic member sleeves the transmission member; or, the rotating assembly further comprises a mounting member, the mounting member and the transmission member are disposed separately and connected to each other, and the elastic member sleeves the mounting member;

the drive mechanism drives, via the transmission member, the elastic member, and the body member in turn, the first lens barrel to move along a first direction with fitting of the first fitting convex portion and the first spiral guide slot, the first direction being a direction approaching or leaving the photosensitive chip; and in a case that the first lens barrel is subjected to an external force, the elastic member makes the first lens barrel move along a direction approaching the photosensitive chip.

10. The electronic device according to claim 9, wherein the body member is an annular member, and the transmission member and the elastic member are both disposed in a circumferential direction of the body member.

11. The electronic device according to claim 9, wherein the body member is provided with a guide slot and a first action portion, the transmission member fits with the guide slot, the first action portion is connected to the first end, and a portion of the transmission member is disposed between a side wall of the guide slot and the first action portion.

12. The electronic device according to claim 9, wherein the transmission member comprises a rack portion and a rod portion, wherein the rack portion is connected to the drive mechanism, the rack portion is provided with a second action portion at an end, and the second end is connected to the second action portion.

13. The electronic device according to claim 9, wherein the transmission member is an annular member.

14. The electronic device according to claim 9, wherein the transmission member and the elastic member are arranged along a direction parallel to an optical axis of the camera module.

15. The electronic device according to claim 9, wherein the transmission member is provided with a first support convex portion and a second support convex portion, the mounting member is connected to both the first support convex portion and the second support convex portion, the body member is provided with a third action portion, the first end is connected to the third action portion, the third action portion fits with the second support convex portion in a limiting manner, and the second end is connected to the first support convex portion.

16. The electronic device according to claim 9, wherein the body member is an annular member, at least two elastic members are provided, and the elastic members are spaced apart along a circumferential direction of the body member.

* * * * *